(12) United States Patent
Conklin et al.

(10) Patent No.: US 9,772,260 B2
(45) Date of Patent: Sep. 26, 2017

(54) BUILDING INTEGRATED PHOTOVOLTAIC DEVICES AS SMART SENSORS FOR INTELLIGENT BUILDING ENERGY MANAGEMENT SYSTEMS

(71) Applicants: John Anthony Conklin, Apalachin, NY (US); Scott Ryan Hammond, Wheat Ridge, CO (US)

(72) Inventors: John Anthony Conklin, Apalachin, NY (US); Scott Ryan Hammond, Wheat Ridge, CO (US)

(73) Assignee: SolarWindow Technologies, Inc., Columbia, MD (US)

( * ) Notice: Subject to any disclaimer, the term of this patent is extended or adjusted under 35 U.S.C. 154(b) by 456 days.

(21) Appl. No.: 14/193,655

(22) Filed: Feb. 28, 2014

(65) Prior Publication Data
US 2014/0330538 A1    Nov. 6, 2014

Related U.S. Application Data

(60) Provisional application No. 61/771,612, filed on Mar. 1, 2013.

(51) Int. Cl.
*G01J 1/42* (2006.01)
*G01M 99/00* (2011.01)
(Continued)

(52) U.S. Cl.
CPC ............ *G01M 99/00* (2013.01); *F24J 2/407* (2013.01); *G01K 13/00* (2013.01); *F24F 2005/0067* (2013.01); *F24F 2011/0049* (2013.01); *G01J 1/4204* (2013.01); *G01K 2207/00* (2013.01); *Y02B 10/12* (2013.01); *Y02B 10/20* (2013.01);
(Continued)

(58) Field of Classification Search
CPC . Y04S 20/242; Y04S 20/244; Y02B 70/3266; Y02B 70/30; Y02B 70/3258; Y02B 70/3275; Y02B 70/3216; F24F 2005/0067; F24F 2011/0049; F24J 2/407; G01J 1/4204; Y02E 10/40
See application file for complete search history.

(56) References Cited

U.S. PATENT DOCUMENTS

| 7,797,084 B2 | 9/2010 | Miwa |
| 2010/0127155 A1 | 5/2010 | Chen et al. |

(Continued)

FOREIGN PATENT DOCUMENTS

| CN | 1960119 A | 5/2007 | |
| CN | 201335997 | * 10/2009 | ............... G05F 1/67 |

(Continued)

OTHER PUBLICATIONS

Computer-generated translation of JP 2006-300428, published on Nov. 2006.*

(Continued)

*Primary Examiner* — Huan Tran
(74) *Attorney, Agent, or Firm* — Dresch IP Law, PLLC; John J. Dresch

(57) ABSTRACT

Building-integrated photovoltaic devices can be provided, which function as sensors, wherein the output parameters from the device are used to provide information about light intensity and ambient temperature, in addition to providing power, to an intelligent building energy management system.

41 Claims, 5 Drawing Sheets

(51) Int. Cl.
  *G01K 13/00* (2006.01)
  *F24J 2/40* (2006.01)
  *F24F 5/00* (2006.01)
  *F24F 11/00* (2006.01)

(52) U.S. Cl.
  CPC ............... *Y02B 10/24* (2013.01); *Y02B 70/30* (2013.01); *Y02B 70/3216* (2013.01); *Y02E 10/40* (2013.01); *Y04S 20/221* (2013.01)

(56) References Cited

U.S. PATENT DOCUMENTS

| | | |
|---|---|---|
| 2011/0270446 A1 | 11/2011 | Scharf et al. |
| 2012/0053867 A1 | 3/2012 | Dunn et al. |
| 2012/0271576 A1 | 10/2012 | Kamel et al. |
| 2013/0006435 A1 | 1/2013 | Berrios et al. |

FOREIGN PATENT DOCUMENTS

| | | |
|---|---|---|
| DE | 20 2004 001246 U1 | 4/2004 |
| EP | 1 925 923 A2 | 5/2008 |
| JP | H0719563 A | 1/1995 |
| JP | 2001 021202 A | 1/2001 |
| JP | 2004 137852 A | 5/2004 |
| JP | 2006300428 A | 11/2006 |
| WO | 2009/011780 A2 | 1/2009 |
| WO | 2012/074808 A2 | 6/2012 |

OTHER PUBLICATIONS

Lee W. Young, International Search Report PCT/US2014/019423 dated Dec. 8, 2014.
Christophe Roy, European Search Report, Application No. 14757234.1 dated Dec. 7, 2016.
Chinese Search Report, Application No. 2014800242738, Office Action dated Jun. 27, 2017.

* cited by examiner

BUILDING INTEGRATED PHOTOVOLTAIC DEVICES AS SMART SENSORS FOR INTELLIGENT BUILDING ENERGY MANAGEMENT SYSTEMS

CROSS-REFERENCE TO RELATED APPLICATION

This application claims the benefit under Title 35, U.S.C. §119 (e) of U.S. provisional application 61/771,612, filed on Mar. 1, 2013, the entire contents of which are hereby incorporated by reference and for which priority is claimed under 35 U.S.C. §120.

FIELD OF THE INVENTION

The present invention is directed to the use of a photovoltaic device as a sensor to provide feedback on building conditions and status to an intelligent building energy management system; and more particularly, to the use of a semitransparent photovoltaic device, such as a semitransparent photovoltaic window, as such a building-integrated sensor.

BACKGROUND OF THE INVENTION

Due to the mounting global energy crisis, there is a continued focus on improving building design and engineering to reduce energy consumption and enable 'smart' energy use. Such 'smart' buildings may incorporate a number of dynamic systems that can react to changing environmental conditions in order to minimize overall energy use while maintaining user comfort. Examples include, but are not limited to: variable transmittance electrochromic windows, automated window shades, photovoltaic energy generation and storage systems, heat pump systems, attic fan systems, and sophisticated HVAC systems. For example, an intelligent building energy management system might register that it is a hot, bright, sunny day, and trigger electrochromic windows into a low transmittance state, or lower automated window shades, in order to reduce solar heat gain in the building and minimize building cooling loads. Alternatively, the energy management system might register that the temperature outside has fallen below the internal building temperature, and activate a heat pump or attic fan system to utilize the temperature differential to provide low-energy use building cooling. As another example, a building control system might sense a bright sunny day, but with low building energy use needs, and thus direct captured photovoltaic energy into an energy-storage system or feed it directly into the grid, rather than into local-use applications.

In order for a building energy management system to intelligently respond to changing building conditions, a network of sensors may be required to provide the necessary data for the control system to react to. To provide all of the data needed to fully run such a smart building, a variety of sensors might be required, including but not limited to: temperature sensors, light intensity sensors, and wind (e.g., direction, intensity) sensors. While such sensors are readily available, the shear number of sensors that may be required to ensure a complete building map, combined with the dynamic building controls, can create a large and complicated building energy management system. Any way to combine or reduce the overall number of smart building elements (e.g., sensors or controls) could significantly reduce the overall complexity and cost of the system.

SUMMARY OF THE INVENTION

The present invention, as illustrated for example in the exemplary embodiments, provides a method for utilizing a photovoltaic device as a sensor for an intelligent building energy management system, the method comprising the steps of comparing at least one of a voltage output parameter and a current output parameter from the photovoltaic device to values obtained under specific benchmark conditions; and based on the step of comparing, providing information about current building conditions to the intelligent building energy management system as input parameters for determining optimal settings for one or more of heating, cooling, and dynamic energy-saving building elements.

Another exemplary embodiment provides an intelligent building energy management system comprising a controller; and a photovoltaic device in communication with the controller, wherein the controller compares at least one of a voltage output parameter and a current output parameter received from the photovoltaic device to predetermined values obtained under specific benchmark conditions to determine information about current building conditions, and determines optimal settings for one or more of heating, cooling, and dynamic energy-saving building elements based on the current building conditions.

In this way, the exemplary embodiments can combine power and sensor data generation into a single unit, thereby reducing the number, complexity, and cost of individual components, which simplifies the overall intelligent building energy management system as compared to conventional building energy management systems.

Prior to describing the exemplary embodiments in greater detail, and to provide a better understanding of the invention, this disclosure will first describe some of the problems with conventional building energy management systems.

As explained above, due to the mounting global energy crisis, there is a continued focus on improving building design and engineering to reduce energy consumption and enable 'smart' energy use. In order for a building energy management system to intelligently respond to changing building conditions, a network of sensors may be required to provide the necessary data for the control system to react to. To provide all of the data needed to fully run such a smart building, a variety of sensors might be required, including but not limited to: temperature sensors, light intensity sensors, and wind (e.g., direction, intensity) sensors. While such sensors are readily available, the shear number of sensors that may be required to ensure a complete building map, combined with the dynamic building controls, can create a large and complicated building energy management system. Any way to combine or reduce the overall number of smart building elements (e.g., sensors or controls) could significantly reduce the overall complexity and cost of the system.

Photovoltaic (PV) modules are increasingly being attached onto or integrated into buildings in order to provide a clean, renewable source of energy to offset building energy needs. The output of a photovoltaic device (e.g., array, module or cell) consists of a certain voltage and current, whose product determines the overall power output of the device. The specific voltage and current output from a device, relative to benchmark values obtained under specific conditions (i.e. ideal AM1.5G 1-sun solar irradiation), can be used to provide information about current light intensity and temperature conditions. For example, both the voltage and current produced by a PV device depend on the incident illumination, but the dependence is different for each parameter. In contrast, the current is relatively insensitive to the temperature, but the voltage produced is proportional to the temperature. By mapping the response of a specific PV device over a variety of illumination and temperature conditions, the output parameters of the device can be used as light intensity and ambient temperature data input into an intelligent building energy management system, in addition to providing power. Such mapping could be readily incorporated into a PV device manufacturer's quality assurance testing routine. Since most PV arrays incorporate a large number of modules over relatively large areas, such systems could replace the need for a large number of independent sensors. A small number of auxiliary conventional (non-PV) sensors could be utilized as a backup and/or dynamic calibration of the PV device sensor data. Additionally, small-area PV devices, likely individual cells or modules, could be used to provide additional sensor data in areas that conventional module or arrays may not be desirable, be it for aesthetic, financial or energy reasons, such as low illumination intensity locations. Such small-area PV sensors could still provide some marginal power to help offset the energy needs of the building energy management system, such as powering a wireless transmitter for sending the sensor data to the management system.

While conventional roof-top PV arrays may make sense in some situations, providing a convenient source of PV device-based sensor data for an intelligent building energy management system, in other situations (e.g. limited roof-top area) such arrays may not make financial or energy-use sense. In these situations, building-integrated photovoltaic (BIPV) devices may provide an alternative opportunity to provide energy management sensor data along with (optional) power. One of the most attractive forms of building-integrated photovoltaic devices is a semitransparent PV device integrated into a building window. A number of solar technologies have been explored for these applications, including but not limited to: conventional crystalline silicon and inorganic thin-film technologies (e.g. cadmium telluride, or copper-indium-gallium-selenide [CIGS]), which are made semitransparent via laser ablation of portions of the active area; and amorphous silicon and organic photovoltaic (OPV) technologies, which are made semitransparent via utilization of dual transparent contacts and low-bandgap absorber materials. While all of these technologies could be used to provide BIPV device-based sensor data for intelligent building energy management systems, OPV-based BIPV presents a number of attractive features for both power and sensor data applications.

OPV devices are uniquely suited for BIPV applications due to their ability to have high visible light transmission (VLT), up to 70%, tunable absorption profiles, and their potentially low-cost, large-area production capabilities. The unique ability to tune the absorption profile of the absorbed materials in OPV devices has enormous benefits for semi-transparent window BIPV applications. This allows the color, VLT, and spectral response of the OPV device to be altered for different applications, markets, and visual effects. This increases the flexibility and usability of the technology, and gives more options to designers and end-users. As with all solar technologies, cost is a major concern. The ability to produce OPV devices via low-temperature and atmospheric pressure high-throughput solution coating techniques enables potentially very low-cost manufacturing, which is critical to ensuring large-scale adoption of the technology. The use of this technology for power generation is the subject of several filings under the trade name SolarWindow™. This technology can also be harnessed for sensor data applications, as well, with or without power generation.

The same properties that make OPV devices attractive for power-generating BIPV applications make them attractive for BIPV smart-building sensor applications; namely their high VLT, tunable color, and potentially low-cost production.

The present invention recognizes that conventional building sensors for use in intelligent building energy management systems add additional cost, complexity, and design restrictions on already complex systems. The shear number of building sensors required to adequately cover a building may result in excessively complex and expensive building energy management systems. By utilizing core smart-building PV components, such as roof-top power-generating PV arrays, low-power independent PV devices, power-generating BIPV units, or low-power BIPV devices as building sensors, the number of individual components and thus the overall complexity and cost of smart-building systems might be reduced.

These problems and others are addressed by the present invention, a first exemplary embodiment of which comprises a method for utilizing a photovoltaic device as a sensor for an intelligent building energy management system, the method comprising the steps of comparing at least one of a voltage output parameter and a current output parameter from the photovoltaic device to values obtained under specific benchmark conditions; and based on the step of comparing, providing information about current building conditions to the intelligent building energy management system as input parameters for determining optimal settings for one or more of heating, cooling, and dynamic energy-saving building elements.

Another exemplary embodiment is directed to an intelligent building energy management system comprising a controller; and a photovoltaic device in communication with the controller, wherein the controller compares at least one of a voltage output parameter and a current output parameter received from the photovoltaic device to predetermined values obtained under specific benchmark conditions to determine information about current building conditions, and determines optimal settings for one or more of heating, cooling, and dynamic energy-saving building elements based on the current building conditions.

More particularly, the present invention can provide a conventional roof-top PV array, made of any of a number of PV technologies, including but not limited to: crystalline silicon, thin-film inorganic technologies such as cadmium telluride, CIGS, or amorphous silicon, or OPV, wherein the PV array is tied into the intelligent building energy management system in such a way that in addition to providing power to the building, either to an energy storage system, a local microgrid, or the larger grid infrastructure, the output parameters of the array, either as a whole or from the individual modules or cells, is used as sensor data to provide information on the current building conditions, including but not limited to light intensity and ambient temperature. The parameters output from the array, modules, and/or cells, such as the voltage and current are necessarily already tracked, and so obtaining this information has no additional costs. This data can then be converted to useful building condition sensor information through comparison with benchmark values obtained under specific conditions, in the form of a calibration map that was performed as part of the array, module, and/or cell manufacturing quality assurance testing, or during system design and installation. A small number of auxiliary conventional building sensors could be used to further supplement and/or calibrate the PV sensor data. In such a way, an existing smart-building component, in this case a power-generating PV array, module, and/or cell, could also serve to provide useful building sensor information, contributing two elements of the intelligent building energy management system from a single component, decreasing system complexity and cost. Due to the generally large areas covered by conventional PV arrays, such combined PV-sensor systems could provide extensive information about building conditions, reducing the number of independent sensor elements required considerably.

Another exemplary embodiment of the invention comprises a comparably small-area conventional PV device, either a module or cell, made of any of a number of PV technologies, including but not limited to: crystalline silicon, thin-film inorganic technologies such as cadmium telluride, CIGS, or amorphous silicon, or OPV, wherein the device output parameters are used to provide building condition sensor information as described previously. In this case, the small-area PV device may be used in a location in which it is not desirable to put a large PV array, be it due to aesthetic, financial, or energy-payback reasons. The small-area PV device can provide the desired sensor information, while still providing modest power output that can be used to offset building energy needs, or can be used to power independent low-energy need systems, such as for wireless transmission of the sensor data to the intelligent building energy management system. In such an implementation, if power output from the sensor drops below that sufficient to allow wireless sensor data transmission, that could be interpreted by the energy management system as, for example, a below-threshold light intensity.

Another exemplary embodiment of the invention comprises a BIPV device, such as a semitransparent window unit, composed of any of a number of PV technologies, including but not limited to: crystalline silicon or thin-film inorganic technologies such as cadmium telluride, CIGS, or amorphous silicon, wherein the BIPV device is tied into the intelligent building energy management system in such a way that in addition to providing power to the building, either to an energy storage system, a local microgrid, or the larger grid infrastructure, the output parameters of the device are used as sensor data to provide information on the current building conditions, including but not limited to light intensity and ambient temperature. The output parameters can be calibrated into useful sensor information through comparison with a calibration map as described previously. In the case of a semitransparent window unit, such building sensor information is very beneficial, as windows are a major source of building energy loss, and thus are a key component of any intelligent building energy management system. The sensor data from such BIPV window units can be used to provide information on how to operate building HVAC or whether or not to actuate such energy-saving components as electrochromic window or dynamic window shade elements.

Another exemplary embodiment of the invention comprises an OPV-based BIPV device, such as a semitransparent window unit, and particularly a SolarWindow™, wherein the BIPV device is tied into the intelligent building energy management system in such a way that in addition to providing power to the building, either to an energy storage system, a local microgrid, or the larger grid infrastructure, the output parameters of the device are used as sensor data to provide information on the current building conditions, including but not limited to light intensity and ambient temperature. The output parameters can be calibrated into useful sensor information through comparison with a calibration map as described previously. As described above, such building sensor information is very beneficial for semitransparent window BIPV applications, such as SolarWindow™, as windows are a major source of building energy loss, and thus are a key component of any smart-building energy management system. The sensor data from such BIPV window units can be used to provide information on how to operate building HVAC or whether or not to actuate such energy-saving components such as electrochromic window or dynamic window shade elements. In the case of OPV-based BIPV devices, and particularly SolarWindow™, the combined power generation and sensor data window units have additional benefits due to their attractive aesthetics, namely their high VLT and tunable color. In contrast, conventional sensors would be highly visible, non-transparent elements when placed on a window, and BIPV units based on other PV technologies sensors have much poorer aesthetics, in that they generally have low VLT and fixed, undesirable visual colors/appearances.

A further exemplary embodiment of the invention comprises a comparably small-area BIPV device, such as a semitransparent window unit, either a module or cell, made of any of a number of PV technologies, including but not limited to: crystalline silicon, thin-film inorganic technologies such as cadmium telluride, CIGS, or amorphous silicon, or OPV, wherein the device output parameters are used to provide building condition sensor information as described previously. In this case, the small-area BIPV device may be used in a location in which it is not desirable to put a large BIPV device, be it due to aesthetic, financial or energy-payback reasons. The small-area BIPV device can provide the desired sensor information, while still providing modest power output that can be used to offset building energy needs, or can be used to power independent low-energy need systems, such as for wireless transmission of the sensor data to the central building management system. In this exemplary implementation, if power output from the sensor drops below a predetermined power output that is sufficient to allow wireless sensor data transmission, then the intelligent building energy management system can interpret this information as, for example, a below-threshold light intensity.

Other features and advantages of the present invention will become apparent to those skilled in the art upon review of the following detailed description and drawings.

BRIEF DESCRIPTION OF THE DRAWINGS

These and other aspects and features of embodiments of the present invention will be better understood after a reading of the following detailed description, together with the attached drawings, wherein.

DETAILED DESCRIPTION OF THE EXEMPLARY EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
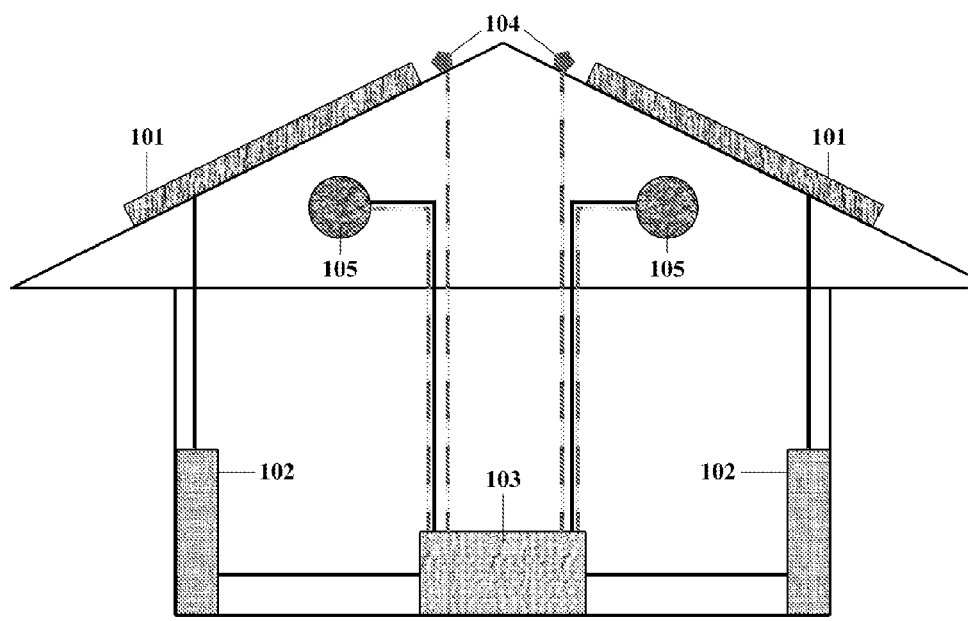
FIG. 1 is a schematic view of a conventional intelligent building energy management system.

Referring now to the drawings, a conventional intelligent building energy management system with discrete power generation, sensor data generation, and controllable building elements, as shown in FIG. 1, will be described in contrast to exemplary embodiments of PV devices that combine power and sensor data generation into a single unit, in order to simplify overall intelligent building energy management system, as illustrated in examples shown in FIGS. 2-5.

As explained above, FIG. 1 is a schematic view illustrating a conventional intelligent building energy management system with discrete power generation, sensor data generation, and controllable building elements. In this exemplary conventional intelligent building energy management system, power from two roof-mounted PV arrays 101 is fed through their respective power conditioners (inverters) 102 into the building control unit 103, which utilizes additional data from two separate roof-mounted sensors 104 to determine whether or not to activate two attic fans (or heat pumps) 105.

With reference to FIGS. 2-5, exemplary embodiments of PV devices will now be described. The exemplary embodiments of PV devices can be configured to combine power and sensor data generation into a single unit, thereby simplifying the overall intelligent building energy management system as compared to conventional building energy management systems, such as the conventional example described in FIG. 1.

Figure 2:
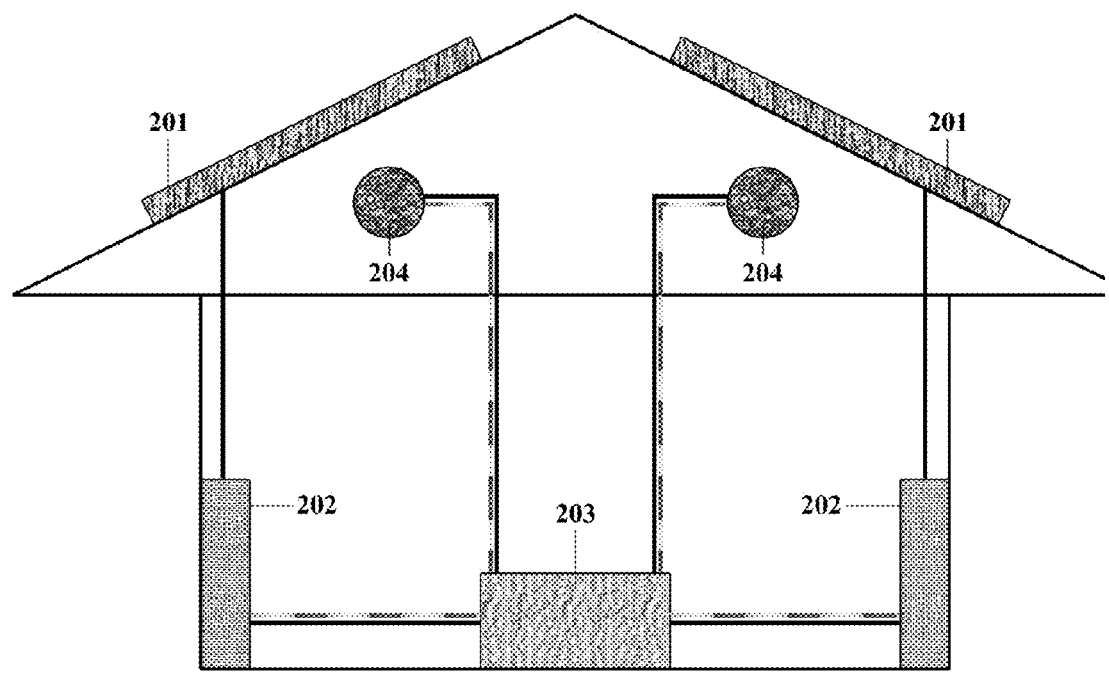
FIG. 2 is a schematic view of an intelligent building energy management system wherein PV arrays provide both power and sensor data to the energy management system according to an exemplary embodiment of the invention.

FIG. 2 is a schematic view of an exemplary embodiment of an intelligent building energy management system wherein the PV arrays provide both power and sensor data to the energy management system. In this example, two roof-mounted PV arrays 201, which may be comprised of one or more of any of a number of PV technologies, including but not limited to: crystalline silicon, thin-film inorganic technologies such as cadmium telluride, CIGS, or amorphous silicon, or OPV, or combinations of one or more types of PV technologies, send their power to their respective power conditioners (inverters) 202. The example illustrates two roof-mounted PV arrays 201. However, one or more roof-mounted PV arrays 201 may be provided. Next, the power conditioners 202 convert the power from the PV arrays 201 into an appropriate format for whatever the current use for the power is; e.g. no conditioning or voltage conversion for direct current (DC) applications such as charging batteries for energy storage or DC-powered microgrid applications, or inverters for producing alternating current (AC) for contributing to the larger grid infrastructure. The output parameters of voltage and current describe the power produced by the PV arrays 201, and these parameters determine what the appropriate use for the power is. As such, these parameters may be monitored and used, and in some cases are always monitored and used, as input parameters into the intelligent building energy management system 203, which controls the power output (solid line). By comparing these output parameters to benchmark values obtained under specific conditions (i.e. ideal AM1.5G 1-sun solar irradiation), they can be used to provide information about current light intensity and/or temperature conditions, along with other information. Thus, the output parameters can be passed along to the energy management system 203 as sensor data (dashed line), and the control unit can use a calibration map to convert that data into useful information about building conditions, such as light intensity and ambient temperature. The energy management system 203 can then use that data to determine whether or not to activate one or more attic fans (or heat pumps), such as the two attic fans (or heat pumps) 204 illustrated in FIG. 2. In this way, the exemplary embodiments of PV devices 201 can be configured to combine power and sensor data generation into a single unit, thereby simplifying the overall intelligent building energy management system as compared to conventional building energy management systems, such as the conventional example described in FIG. 1. The foregoing example describes a highly simplified building control system to illustrate the inventive features of the present invention. In operation, a building control system may include many more PV power and sensor generating units, additional sensor units, and additional controllable building elements.

Figure 3:
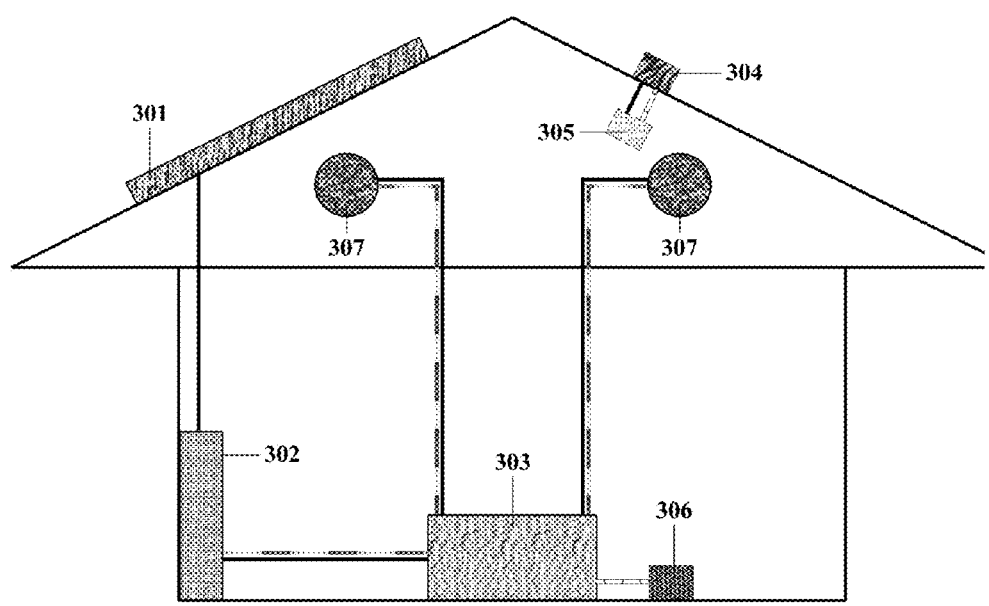
FIG. 3 is a schematic view of an intelligent building energy management system wherein a roof-mounted PV array provides both power and sensor data to the energy management system according to one exemplary embodiment of the invention, and a small-area PV device provides sensor data and sufficient power to allow wireless transmission of the sensor data to the energy management system, according to another exemplary embodiment of the invention.

FIG. 3 is a schematic view of another exemplary embodiment of an intelligent building energy management system wherein a roof-mounted PV array provides both power and sensor data to the energy management system. In this example, a small-area PV device also can provide sensor data and sufficient power to allow wireless transmission of the sensor data. The roof-mounted PV array 301 sends power to its power conditioner (inverter) 302, which provides both power (solid line) and sensor data (dashed line) to the energy management system 303. The roof-mounted small-area PV sensor device 304 provides power directly to a wireless transmitter 305, which sends the sensor data derived from the PV sensor device output parameters to a wireless receiver 306, which then passes the sensor information to the energy management system 303. The energy management system can use the sensor data from either or both of the PV array 301 and the PV sensor device 304 to determine whether or not to turn on the attic fans (or heat pumps) 307. In this way, this exemplary embodiment of a roof-mounted PV array 301 can provide both power and sensor data to an energy management system 303, and additionally or alternatively, a small-area PV device 304 can provide sensor data and sufficient power to allow wireless transmission of the sensor data, thereby simplifying the overall intelligent building energy management system as compared to conventional building energy management systems, such as the conventional example described in FIG. 1.

Figure 4:
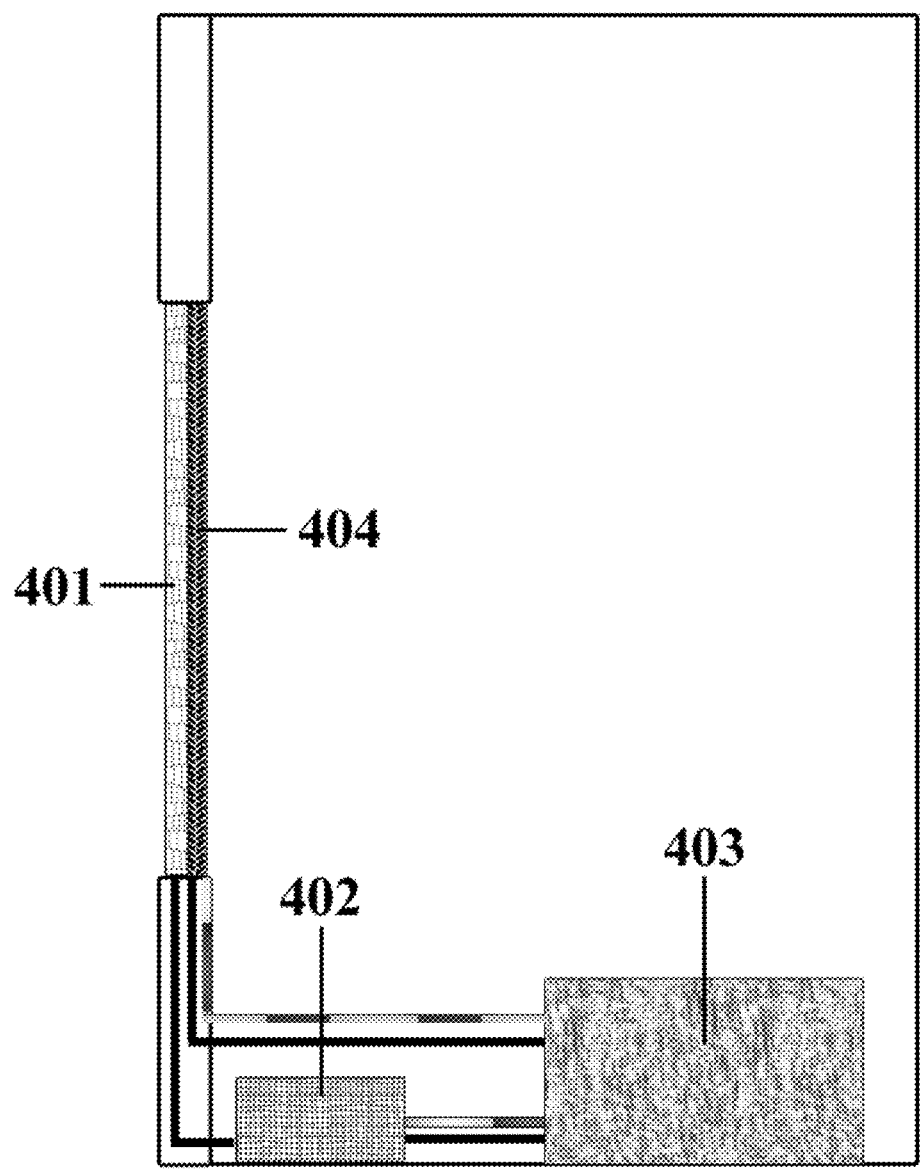
FIG. 4 is a schematic view of an intelligent building energy management system wherein a BIPV device, in the form of a semitransparent window unit such as SolarWindow™, provides both power and sensor data to the energy management system according to an exemplary embodiment of the invention.

FIG. 4 is a schematic view of another exemplary embodiment of an intelligent building energy management system wherein a BIPV device, in the form of, for example, a semitransparent window unit such as SolarWindow™ described above, provides both power and sensor data to the energy management system. The semitransparent window BIPV device 401 sends power to its power conditioner (inverter) 402, which passes both power (solid line) and sensor data (dashed line) derived from its output parameters to the energy management system 403, which determines whether an electrochromic window element 404 should be in its high VLT or low VLT state. In this way, this exemplary embodiment can provide a BIPV device 401 that provides both power and sensor data to an energy management system 403, thereby simplifying the overall intelligent building energy management system as compared to conventional building energy management systems, such as the conventional example described in FIG. 1.

Figure 5:
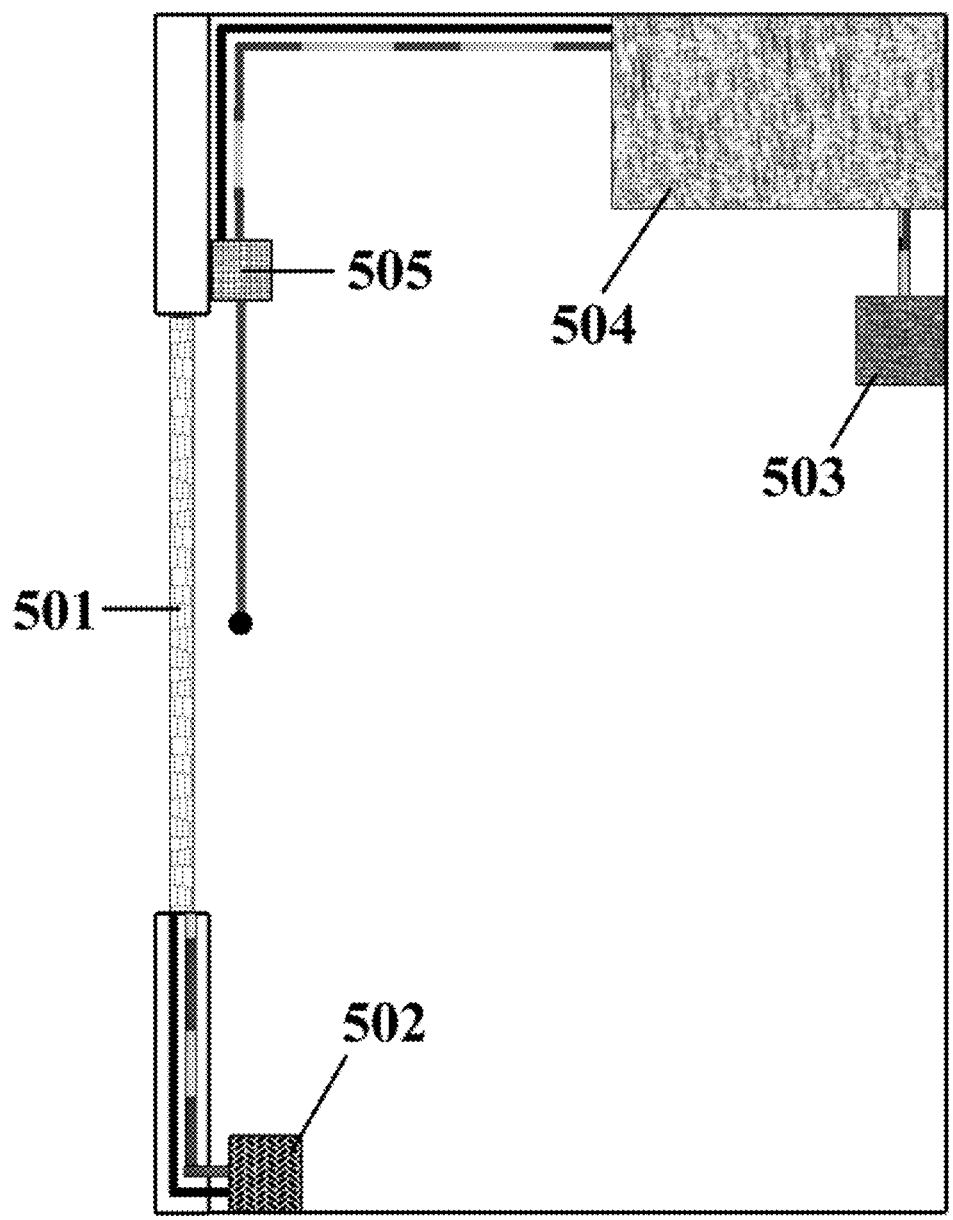
FIG. 5 is a schematic view of an intelligent building energy management system wherein a semitransparent BIPV device, provides sensor data and sufficient power to allow wireless transmission of the sensor data to the energy management system according to an exemplary embodiment of the invention.

FIG. 5 is a schematic view of yet another exemplary embodiment of an intelligent building energy management system wherein a BIPV device, for example a semitransparent BIPV device, provides sensor data to the energy management system. As shown in FIG. 5, a semitransparent BIPV device 501 provides power directly to a wireless transmitter 502, which sends the sensor data derived from the PV sensor device output parameters to a wireless receiver 503, which then passes the sensor information to the energy management system 504. The energy management system 504 then determines whether a dynamic window shade element 505 should be raised or lowered. In this way, this exemplary embodiment can provide a BIPV device 501 that provides both power and sensor data to an energy management system 503, thereby simplifying the overall intelligent building energy management system as compared to conventional building energy management systems, such as the conventional example described in FIG. 1.

To summarize, the exemplary embodiments provide a method for utilizing a photovoltaic device as a sensor, wherein the voltage and current output parameters from the device are compared to values obtained under specific benchmark conditions, in order to provide information about light intensity and ambient temperature that can be used by an intelligent building energy management system as input parameters to help determine optimal settings for heating, cooling, and various dynamic energy-saving building elements.

The photovoltaic device can be a conventional roof-top photovoltaic array based upon one or more of the following photovoltaic technologies: crystalline silicon, cadmium telluride, copper-indium-gallium-selenide, copper-zinc-tin-sulfide, amorphous silicon, or organic photovolatics, and both the power output and sensor output can be used by the building energy management system.

The photovoltaic device can be a small-area roof-top photovoltaic module or cell, and the power output of the device can be used to power a wireless transmitter for sending the sensor data output to the building energy management system.

The photovoltaic device can be a semitransparent building-integrated photovoltaic module or cell based upon one of the following photovoltaic technologies: crystalline silicon, cadmium telluride, copper-indium-gallium-selenide, copper-zinc-tin-sulfide, or amorphous silicon, and both the power output and sensor output can be used by the building energy management system.

The photovoltaic device can be a semitransparent building-integrated photovoltaic module or cell based upon one of the following photovoltaic technologies: crystalline silicon, cadmium telluride, copper-indium-gallium-selenide, copper-zinc-tin-sulfide, or amorphous silicon, and the power output can be used to power a wireless transmitter to send the sensor output data to the building energy management system.

The photovoltaic device can be a semitransparent building-integrated photovoltaic module or cell based upon organic photovoltaic technology, and both the power output and sensor output can be used by the building energy management system.

The photovoltaic device can be a semitransparent building-integrated photovoltaic module or cell based upon inverted architecture organic photovoltaic technology, and both the power output and sensor output can be used by the building energy management system.

The photovoltaic device can be a semitransparent building-integrated photovoltaic module or cell based upon inverted architecture organic photovoltaic technology, and the power output can be used to power a wireless transmitter to send the sensor output data to the building energy management system.

The photovoltaic sensors are complemented by conventional, non-photovoltaic sensors to provide dynamic calibration of the photovoltaic sensor data, as well as to provide data relevant to the intelligent building energy management system that is not obtainable from the photovoltaic sensors.

The dynamic energy saving building elements of the intelligent building energy management system are selected from the list: electrochromic windows, automatic window shades, attic fans, vent fans, heat pumps, HVAC systems, and radiant heat systems.

The present invention has been described herein in terms of several simplified and preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A method for utilizing a photovoltaic device as a sensor for an intelligent building energy management system, the method comprising the steps of:
   comparing at least one of a voltage output parameter and a current output parameter from the photovoltaic device to values obtained under specific benchmark conditions; and
   based on the step of comparing, providing information about current building conditions to the intelligent building energy management system as input parameters for determining optimal settings for one or more of heating, cooling, and dynamic energy-saving building elements.

2. The method of claim 1, wherein the current building conditions include one or more of light intensity and ambient temperature.

3. The method of claim 1, wherein both a power output and a sensor output is used by the building energy management system for determining optimal settings.

4. The method of claim 1, wherein the photovoltaic device comprises a roof-top photovoltaic array based upon one or more photovoltaic technologies including one or more of crystalline silicon, cadmium telluride, copper-indium-gallium-selenide, copper-zinc-tin-sulfide, amorphous silicon, and organic photovoltaics.

5. The method of claim 4, wherein both a power output and a sensor output is used by the building energy management system for determining optimal settings.

6. The method of claim 1, wherein the photovoltaic device comprises a small-area roof-top photovoltaic module or cell, and a power output of the photovoltaic device is used to power a wireless transmitter for sending a sensor data output to the building energy management system.

7. The method of claim 1, wherein the photovoltaic device comprises a semitransparent building-integrated photovoltaic module or cell based upon one or more photovoltaic technologies including one or more of crystalline silicon, cadmium telluride, copper-indium-gallium-selenide, copper-zinc-tin-sulfide, and amorphous silicon.

8. The method of claim 7, wherein both a power output and a sensor output is used by the building energy management system for determining optimal settings.

9. The method of claim 7, wherein a power output is used to power a wireless transmitter to send sensor output data to the building energy management system for determining optimal settings.

10. The method of claim 1, wherein the photovoltaic device comprises a semitransparent building-integrated photovoltaic module or cell based upon organic photovoltaic technology.

11. The method of claim 10, wherein both a power output and a sensor output is used by the building energy management system for determining optimal settings.

12. The method of claim 1, wherein the photovoltaic device comprises a semitransparent building-integrated photovoltaic module or cell based upon inverted architecture organic photovoltaic technology.

13. The method of claim 12, wherein both a power output and a sensor output is used by the building energy management system for determining optimal settings.

14. The method of claim 12, wherein a power output is used to power a wireless transmitter to send sensor output data to the building energy management system.

15. The method of claim 1, further comprising:
providing dynamic calibration of the photovoltaic sensor data using non-photovoltaic sensors, and
providing additional data, from the non-photovoltaic sensors, to the intelligent building energy management system.

16. The method of claim 1, wherein the dynamic energy saving building elements of the intelligent building energy management system comprise one or more of electrochromic windows, automatic window shades, attic fans, vent fans, heat pumps, HVAC systems, and radiant heat systems.

17. The method of claim 1, wherein a power output is used to power a wireless transmitter to send sensor output data to the building energy management system for determining optimal settings.

18. The method of claim 1, wherein the photovoltaic device comprises a semitransparent window unit based upon one or more photovoltaic technologies.

19. The method of claim 18, wherein both a power output and a sensor output is used by the building energy management system for determining optimal settings.

20. The method of claim 18, wherein a power output is used to power a wireless transmitter to send sensor output data to the building energy management system for determining optimal settings.

21. An intelligent building energy management system comprising:
a controller; and
a photovoltaic device in communication with the controller,
wherein the controller compares at least one of a voltage output parameter and a current output parameter received from the photovoltaic device to predetermined values obtained under specific benchmark conditions to determine information about current building conditions, and determines optimal settings for one or more of heating, cooling, and dynamic energy-saving building elements based on the current building conditions.

22. The system of claim 21, wherein the current building conditions include one or more of light intensity and ambient temperature.

23. The system of claim 21, wherein the controller determines the optimal settings based on both a power output and a sensor output of the photovoltaic device.

24. The system of claim 21, wherein the photovoltaic device comprises a roof-top photovoltaic array based upon one or more photovoltaic technologies including one or more of crystalline silicon, cadmium telluride, copper-indium-gallium-selenide, copper-zinc-tin-sulfide, amorphous silicon, and organic photovoltaics.

25. The system of claim 24, wherein the controller determines the optimal settings based on both a power output and a sensor output of the photovoltaic device.

26. The system of claim 21, wherein the photovoltaic device comprises a small-area roof-top photovoltaic module or cell, and
wherein a power output of the photovoltaic device is used to power a wireless transmitter for sending a sensor data output from the photovoltaic device to the building energy management system.

27. The system of claim 21, wherein the photovoltaic device comprises a semitransparent building-integrated photovoltaic module or cell based upon one or more photovoltaic technologies including one or more of crystalline silicon, cadmium telluride, copper-indium-gallium-selenide, copper-zinc-tin-sulfide, and amorphous silicon.

28. The system of claim 27, wherein the controller determines the optimal settings based on both a power output and a sensor output of the photovoltaic device.

29. The system of claim 27, wherein a power output of the photovoltaic device is used to power a wireless transmitter to send sensor output data from the photovoltaic device to the building energy management system for determining optimal settings.

30. The system of claim 21, wherein the photovoltaic device comprises a semitransparent building-integrated photovoltaic module or cell based upon organic photovoltaic technology.

31. The system of claim 30, wherein the controller determines the optimal settings based on both a power output and a sensor output of the photovoltaic device.

32. The system of claim 21, wherein the photovoltaic device comprises a semitransparent building-integrated photovoltaic module or cell based upon inverted architecture organic photovoltaic technology.

33. The system of claim 32, wherein the controller determines the optimal settings based on both a power output and a sensor output of the photovoltaic device.

34. The system of claim 32, wherein a power output of the photovoltaic device is used to power a wireless transmitter to send sensor output data from the photovoltaic device to the building energy management system.

35. The system of claim 21, further comprising:
one or more non-photovoltaic sensors,
wherein the controller uses data from the non-photovoltaic sensors to provide dynamic calibration of sensor data from the photovoltaic device.

36. The system of claim 35, wherein the non-photovoltaic sensors provide additional data, which is not obtainable using the photovoltaic device, to the controller.

37. The system of claim 21, wherein the dynamic energy saving building elements of the intelligent building energy management system comprise one or more of electrochromic windows, automatic window shades, attic fans, vent fans, heat pumps, HVAC systems, and radiant heat systems.

38. The system of claim 21, wherein a power output of the photovoltaic device is used to power a wireless transmitter to send sensor output data from the photovoltaic device to the building energy management system for determining optimal settings.

39. The system of claim 21, wherein the photovoltaic device comprises a semitransparent window unit based upon one or more photovoltaic technologies.

40. The system of claim 39, wherein the controller determines the optimal settings based on both a power output and a sensor output of the photovoltaic device.

41. The system of claim 39, wherein a power output of the photovoltaic device is used to power a wireless transmitter to send sensor output data from the photovoltaic device to the building energy management system for determining optimal settings.

* * * * *